US008233437B2

(12) United States Patent
Tazaki (10) Patent No.: US 8,233,437 B2
(45) Date of Patent: Jul. 31, 2012

(54) MOBILE IP COMMUNICATION SYSTEM, APPARATUS, AND METHOD WITH DHCP PROXY FUNCTIONS

(75) Inventor: Yuji Tazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 12/558,192

(22) Filed: Sep. 11, 2009

(65) Prior Publication Data

US 2010/0002634 A1    Jan. 7, 2010

Related U.S. Application Data

(63) Continuation of application No. PCT/JP2007/055532, filed on Mar. 19, 2007.

(51) Int. Cl.
*H04W 4/00* (2009.01)
(52) U.S. Cl. ...................................................... 370/328
(58) Field of Classification Search .................... 370/328
See application file for complete search history.

(56) References Cited

U.S. PATENT DOCUMENTS

| 2005/0074015 A1* | 4/2005 | Chari et al. ................... 370/400 |
| 2006/0206597 A1* | 9/2006 | Kim et al. ..................... 709/220 |
| 2007/0002833 A1* | 1/2007 | Bajic ............................ 370/352 |
| 2008/0002642 A1* | 1/2008 | Borkar et al. ................. 370/338 |

FOREIGN PATENT DOCUMENTS

| JP | 2000270020 | 9/2000 |
| JP | 2005124087 | 5/2005 |
| JP | 2006165971 | 6/2006 |

OTHER PUBLICATIONS

Notification Concerning transmittal of International Preliminary Report on Patentability dated Oct. 1, 2009 received in corresponding Japanese Patent Application No. PCT/JP2007/055532.
International Search Report dated May 29, 2007.
Hiromi Komiya "7-tsu no Merit o Tettei Kaisetsu" The introduction of Wireless LAN Switch, N+I Network, vol. 4, No. 5, pp. 44 to 53, Softbank Publishing Inc., May 1, 2004.
Tomoyoshi Motoyama, Koichi Suto, Yasuyuki Okumura, Smooth Mobile Network Service System Using the Snooping Router (SR) on Mobile IP Network, The IEICE Transactions on Communications (Japanese Edition) (J88-B), No. 3, pp. 622 to 633, The Institute of Electronics, Information and Communication Engineers, Mar. 1, 2005, ISSN 1344-4697.

* cited by examiner

*Primary Examiner* — Ayaz Sheikh
*Assistant Examiner* — Hai-Chang Hsiung
(74) *Attorney, Agent, or Firm* — Murphy & King, P.C.

(57) ABSTRACT

A communication system includes mobile IP communication apparatuses in an access service network and having proxy mobile IP client functioning units, foreign agent functioning units, and DHCP proxy functioning units, which have a common IP address. The DHCP proxy functioning unit of a first mobile IP communication apparatus, connected with a mobile station before movement, reports information about the mobile station to a second mobile IP communication apparatus connected with the mobile station after movement. The DHCP proxy functioning unit of the second mobile IP communication apparatus receives the information about the mobile station and further receives from the mobile station, an update message addressed to the common IP address, executes an IP address update process based on the information about the mobile station, and reports an update result to the proxy mobile IP client functioning unit and the foreign agent functioning unit in the second mobile IP communication apparatus.

12 Claims, 10 Drawing Sheets

MOBILE IP COMMUNICATION SYSTEM, APPARATUS, AND METHOD WITH DHCP PROXY FUNCTIONS

CROSS-REFERENCE TO RELATED APPLICATIONS

This is a continuation application of International Application Number PCT/JP2007/055532, which was filed on Mar. 19, 2007, the entirety of which is incorporated herein by reference.

FIELD

The embodiments discussed herein are related to a mobile IP communication system, a mobile IP communication apparatus, and a mobile IP communication method.

BACKGROUND

Recently, Worldwide Interoperability for Microwave Access (WiMAX) has attracted attention as a wireless communication technology capable of high-speed and long-distance transmission. WiMAX systems assume application to a network using an IP protocol and implement a mobile service by combining a Layer 3 mobility technology (mobile IP) and a Layer 2 mobility technology based on the technology of IEEE 802.16e.

Currently, protocol specifications are developed by the WiMAX Forum, which is an industry organization. To provide a mobile service utilizing a WiMAX system to mobile terminals not equipped with a mobile IP function, a "proxy mobile IP scheme" is under study to provide client function of the mobile IP on the network side. To implement a method of adding IP addresses to mobile terminals as a mode using Dynamic Host Configuration Protocol (DHCP) widely utilized in Internet access services, a mode of providing a DHCP proxy function on the network side is under discussion.

Figure 9:
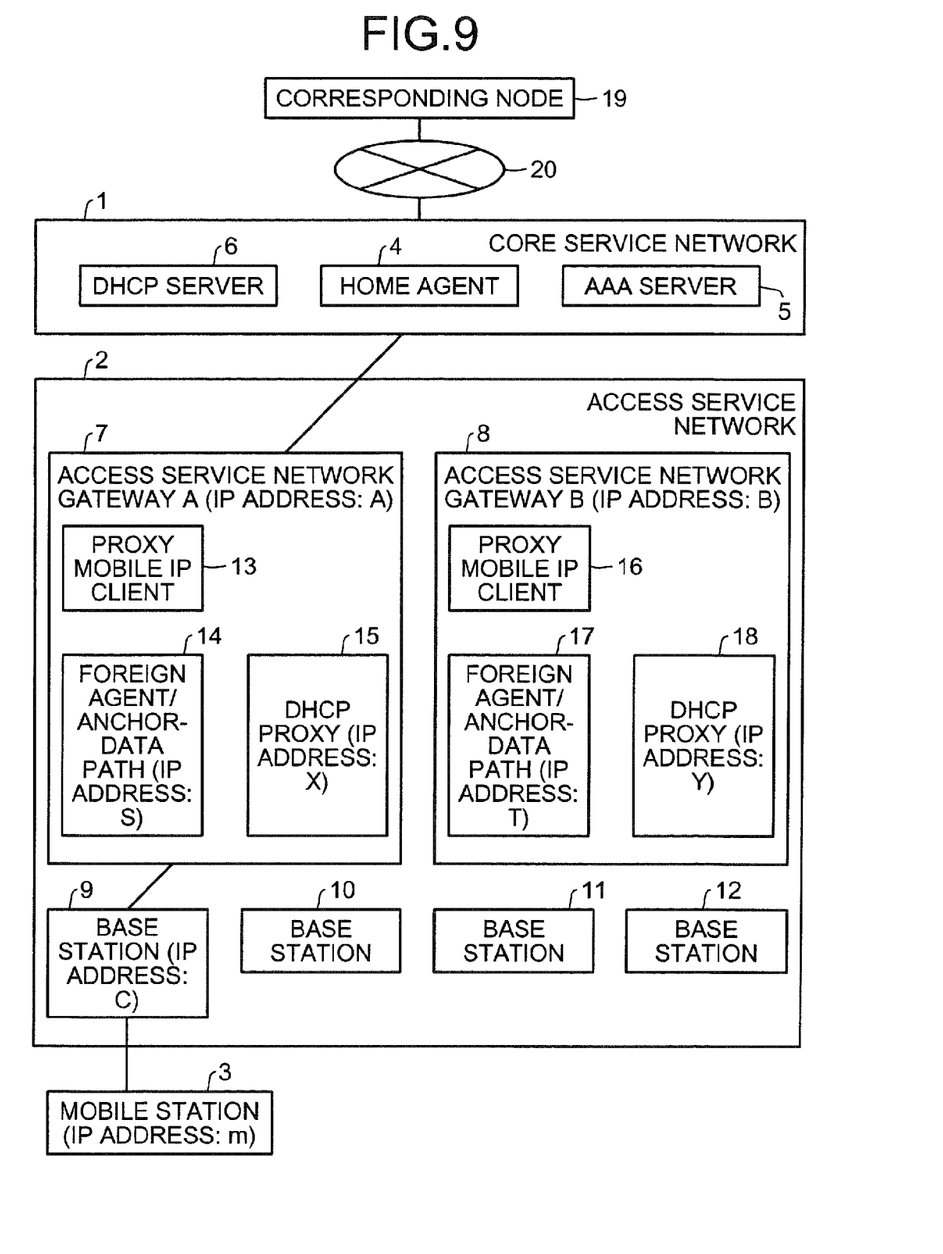
FIG. 9 depicts a configuration of a WiMAX system in the proxy mobile IP scheme.

FIG. 9 depicts a configuration of a WiMAX system in the proxy mobile IP scheme. As depicted in FIG. 9, the WiMAX system is generally made up of a core service network (CSN) 1, an access service network (ASN) 2, and a mobile station (MS) 3.

The core service network 1 includes a home agent (HA) 4, a AAA server 5 that performs Authentication/Authorization/Accounting, information collection, etc., and a DHCP server 6. The access service network 2 includes plural access service network gateways 7 and 8, e.g., two in the example depicted and plural base stations (BS) 9, 10, 11, and 12, e.g., two for each of the access service network gateways 7 and 8 in the example depicted.

The access service network gateways 7 and 8 and the base stations 9, 10, 11, and 12 cooperate to perform IP address management for the mobile station 3 and the handover control according to movement of the mobile stations. When two access service network gateways are to be differentiated herein, one is referred to as an access service network gateway A and the other is referred to as an access service network gateway B. For example, the base stations 9 and 10 are connected with the access service network gateway A7; and the base stations 11 and 12 are connected with the access service network gateway B8.

The access service network gateway A7 includes a proxy mobile IP (PMIP) client functioning unit A13, a foreign agent/anchor-data path functioning unit A14, and a DHCP proxy functioning unit A15. Similarly, the access service network gateway B8 includes a proxy mobile IP client functioning unit B16, a foreign agent/anchor-data path functioning unit B17, and a DHCP proxy functioning unit B18. The anchor-data path function is a function of encapsulating user data (packet) by a scheme such as generic routing encapsulation (GRE) to deliver the data to the base stations.

A functional unit with "A" appended to the end of the name of the functional unit (before reference numeral) herein constitutes the access service network gateway A and a functional unit with "B" appended thereto constitutes the access service network gateway B. When the mobile station 3 performs registration with an initial network, an IP address is issued from the home agent 4, the AAA server 5, or the DHCP server 6.

The DHCP proxy functioning unit A15, as a substitute for the DHCP server 6, issues an IP address to the mobile station 3. If DHCP is utilized, an update process is necessary for the issued IP address. If the home address (HoA) of the mobile station 3 is changed, the proxy mobile IP client functioning unit A13 must be notified of a new IP address.

In FIG. 9, when a corresponding node 19 transmits to the internet 20, a packet addressed to the mobile station 3 (assumed to have an IP address: m), the packet arrives at the home agent 4 via the internet 20. The home agent 4 searches a management table and determines a foreign agent functioning unit (assumed to have an IP address: S) of the foreign agent/anchor-data path functioning unit A14 as the transfer destination. The home agent 4 then encapsulates the packet having the destination IP address of m in a packet having the destination IP address of S and transmits the packet using an IP tunneling technology through the R3 data path.

The foreign agent functioning unit of the foreign agent/anchor-data path functioning unit A14 receives the packet addressed thereto and decapsulates the packet to extract the packet having the destination IP address of m. The foreign agent functioning unit searches a management table and determines the base station (assumed to have an IP address: C) as the transfer destination. The foreign agent functioning unit then encapsulates the packet having the destination IP address of m in a packet having the destination IP address of C and transmits the packet using an IP tunneling technology through the R6 data path.

The base station 9 receives the packet addressed thereto and decapsulates the packet to extract the packet having the destination IP address of m. The base station 9 transmits the packet to the mobile station 3. As the mobile station 3 moves, the base station serving as the connection destination of the mobile station 3 is switched as needed. The connection destination after the movement of the mobile station 3 may be the other base station 10 connected to the same access service network gateway A7 as before the movement.

Figure 10:
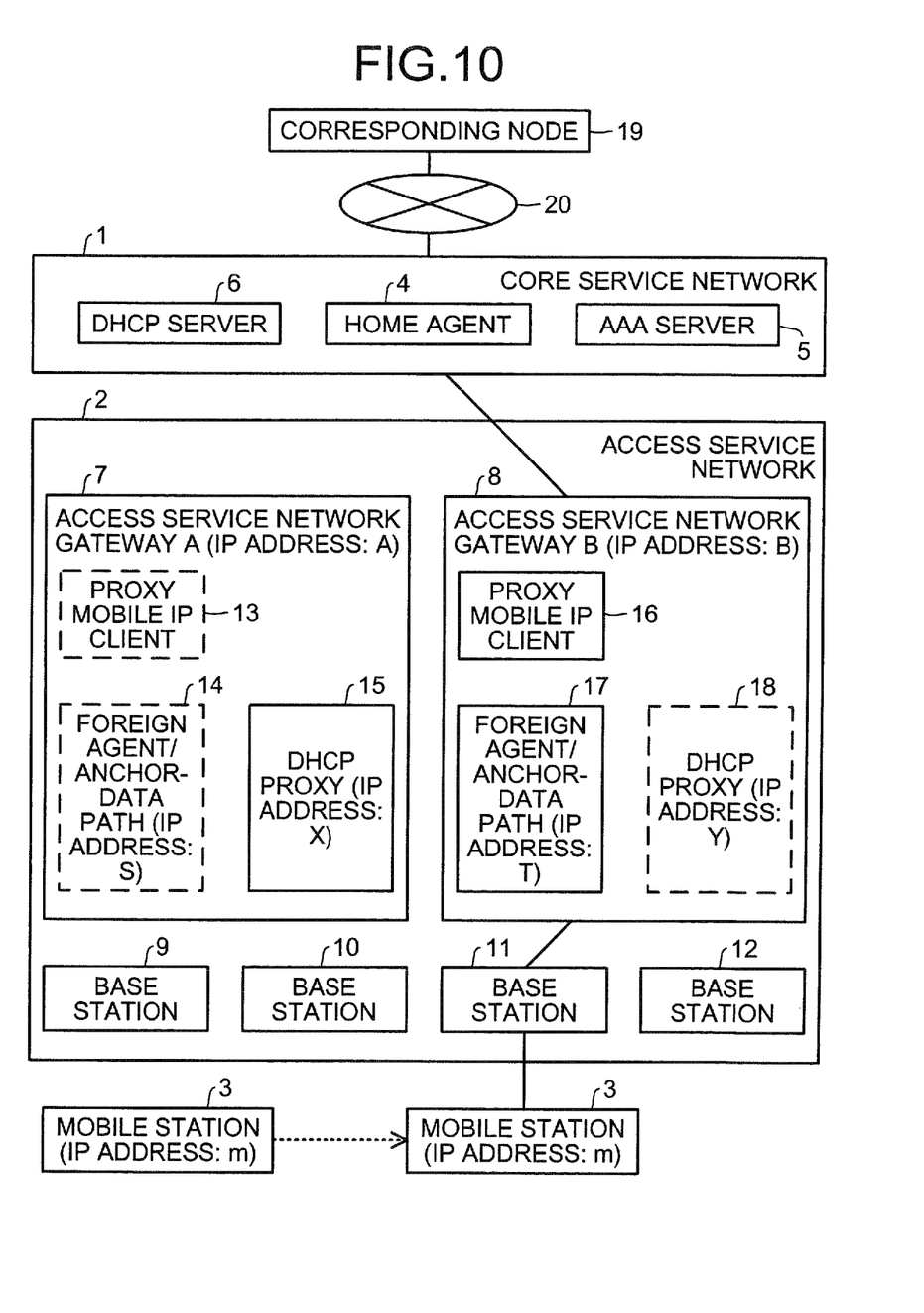
FIG. 10 is a schematic depicting switch-over of the connection destination due to movement of a mobile station.

FIG. 10 is a schematic depicting switch-over of the connection destination due to movement of the mobile station. As depicted in FIG. 10, the connection destination of the mobile station 3 after the movement may be the base station 11 connected to the access service network gateway B8 different from that before the movement. In this case, through the handover of the mobile station 3, the foreign agent/anchor-data path functioning unit B17 of the access service network gateway B8 cooperates with the home agent 4 to control the connection, as substitute for the foreign agent/anchor-data path functioning unit A14 of the access service network gateway A7. Such a switch-over may be comprehended as if the foreign agent/anchor-data path functioning unit controlling the connection between a given mobile station and the home agent 4 is moved to another access service network gateway and, therefore, is referred to as relocation.

A mobile terminal control method is known that enables the internet connection to be continued without interruption of data transmission/reception, if the basic service set (BSS) is changed in a mobile terminal connected to the internet through a wireless LAN system due to the handover. This mobile terminal control method includes a detecting step of detecting the change of the BSS due to the handover of the terminal and a control step of making an inquiry with a DHCP server for subnet information while continuing data transmission/reception when the change of the BSS is detected, and further acquiring a new IP address from the DHCP server when a subnet ascertained by the inquiry is different from a subnet before the change of the BSS, and controlling Internet connection using the IP address (see e.g., Japanese Laid-Open Patent Publication No. 2005-124087 (paragraph number)).

A network management system is known that manages terminals to which network IP addresses are automatically distributed. This network management system includes a communication confirming unit that communicates with devices within a network to acquire the network IP addresses of the devices, an IP address inquiring unit that making an inquiry for the distributed network IP addresses with a server that automatically distributes the network IP addresses, a device IP address information storage unit that stores information concerning the network IP addresses of the devices managed in the network, and an automatic device recognizing unit that makes a comparison in response to the notification from the communication confirming unit or the notification from the IP address inquiring unit to output information to indicate that the network IP address is not registered when the network IP address of the notification does not exist (see e.g., Japanese Patent Application Laid-Open Publication No. 2000-270020 (paragraph number)).

However, since the movement of a mobile station is not assumed in the operation of the DHCP proxy functioning unit in the WiMAX system of the conventional proxy mobile IP scheme described above, the following problems occur when the access service network gateway is switched due to the movement of a mobile station. As depicted in FIG. 10, when the access service network gateway is switched from A to B, relocation occurs and the foreign agent/anchor-data path functioning unit B17 of the access service network gateway B8 newly becomes responsible for the connection with the base station 11 and the home agent 4.

However, since the mobile station 3 cannot recognize that the responsibility for the anchor-data path function and the foreign agent function has changed and been given to the foreign agent/anchor-data path functioning unit B17 on the network side, the mobile station 3 makes a request for the update of the IP address to the DHCP proxy functioning unit A15 at the time of the registration to the initial network. Therefore, the foreign agent/anchor-data path functioning unit B17 of the access service network gateway B8 is unable to know the result of the IP address update by the DHCP proxy functioning unit A15 of the access service network gateway A7.

Since the home agent 4 and the foreign agent functioning unit are correlated according to the IP address of the mobile station 3, if the IP address of the mobile station 3 is updated, the relationship between the home agent 4 and the foreign agent functioning unit must be reset. However, if the update result of the IP address of the mobile station 3 is not known, the reset cannot be performed and therefore, the end-to-end communication, i.e., the communication between the mobile station 3 and the corresponding node 19 is no longer sustainable.

SUMMARY

According to an aspect of an embodiment, a communication system includes mobile IP communication apparatuses in an access service network and having proxy mobile IP client functioning units, foreign agent functioning units, and DHCP proxy functioning units, which have a common IP address. The DHCP proxy functioning unit of a first mobile IP communication apparatus, connected with a mobile station before movement, reports information about the mobile station to a second mobile IP communication apparatus connected with the mobile station after movement. The DHCP proxy functioning unit of the second mobile IP communication apparatus receives the information about the mobile station and further receives from the mobile station, an update message addressed to the common IP address, executes an IP address update process based on the information about the mobile station, and reports an update result to the proxy mobile IP client functioning unit and the foreign agent functioning unit in the second mobile IP communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

An example in which the present invention is applied to a WiMAX system of a proxy mobile IP scheme will be described. The present invention is not limited by the present embodiments.

Figure 1:
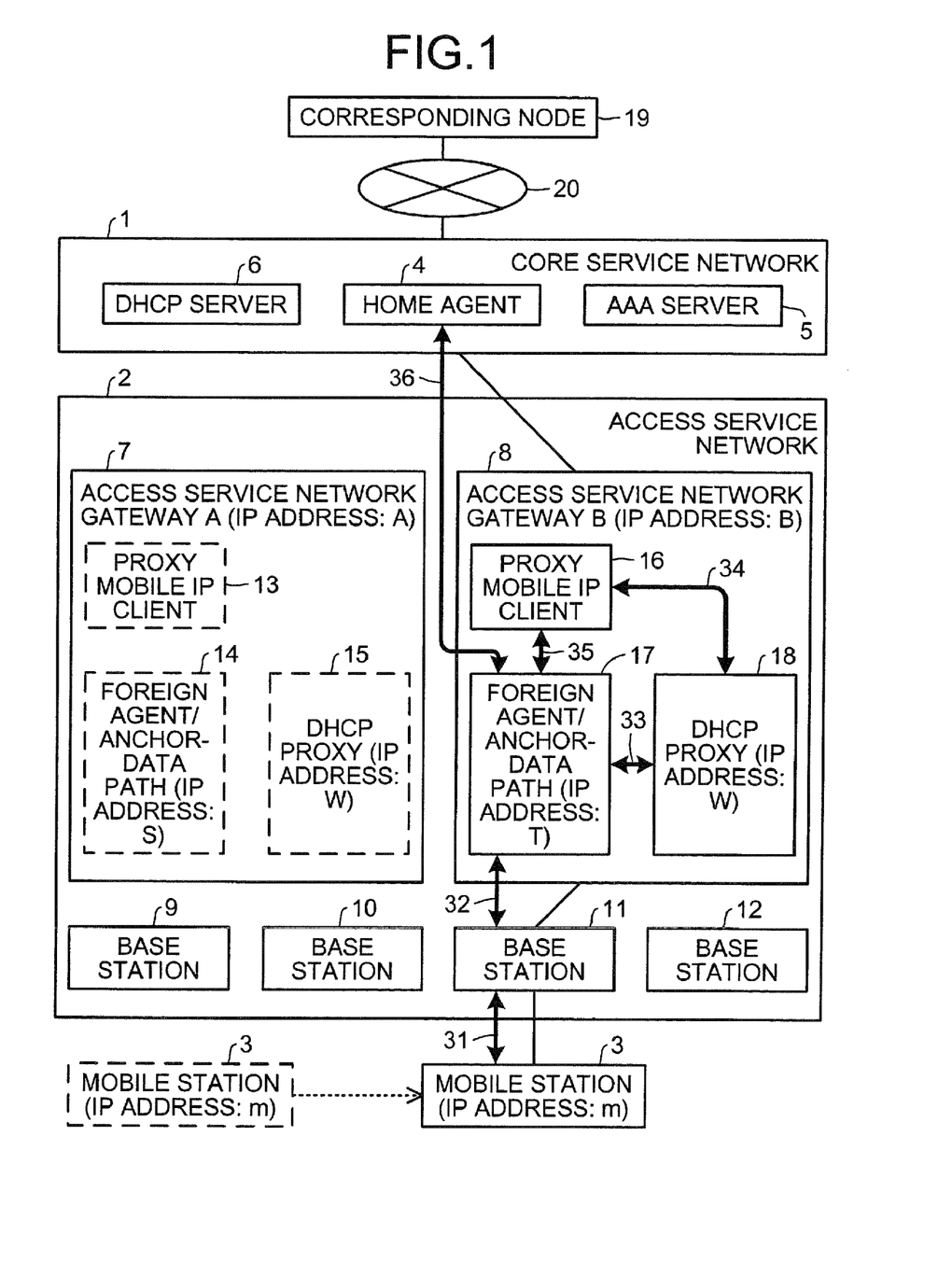
FIG. 1 is a schematic of a configuration and data paths of a mobile IP communication system after relocation according to a first embodiment of the present invention.

FIG. 1 is a schematic of a configuration and data paths of a mobile IP communication system after relocation according to a first embodiment of the present invention. In FIG. 1, arrows with reference numerals represent data paths (the same applies to FIGS. 3, 5, and 7). As depicted in FIG. 1, the configuration of the mobile IP communication system is identical to the WiMAX system of the common proxy mobile IP scheme. Therefore, constituent elements and operations identical to those of the WiMAX system of the common proxy mobile IP scheme will not be described. The access service network gateway A7 and the access service network gateway B8 are assumed to be a mobile IP communication apparatus before the relocation and a mobile IP communication apparatus after the relocation, respectively.

In plural access service network gateways, e.g., two access service network gateways 7 and 8 of A and B existing in an access service network 2 in the example depicted, DHCP proxy functioning units 15 and 18 have a common IP address (assumed as W). Therefore, the DHCP proxy functioning units 15 and 18 of the access service network gateways 7 and 8 may receive IP address update messages from mobile stations connected downstream to the respective access service network gateways 7 and 8.

When the relocation occurs among the proxy mobile IP client functioning units 13 and 16 and the foreign agent/anchor-data path functioning units 14 and 17, the access service network gateways 7 and 8 have a function of reporting pre-relocation DHCP proxy information, i.e., the DHCP proxy information before the relocation such as release time of the IP address of the mobile station, etc., to the access service network gateway to which the relocation occurs. Therefore, the DHCP proxy functioning unit A15 may be relocated along with the relocation of the proxy mobile IP client functioning unit A13 and the foreign agent/anchor-data path functioning unit A14 in the access service network gateway A7 before the relocation.

Figure 2:
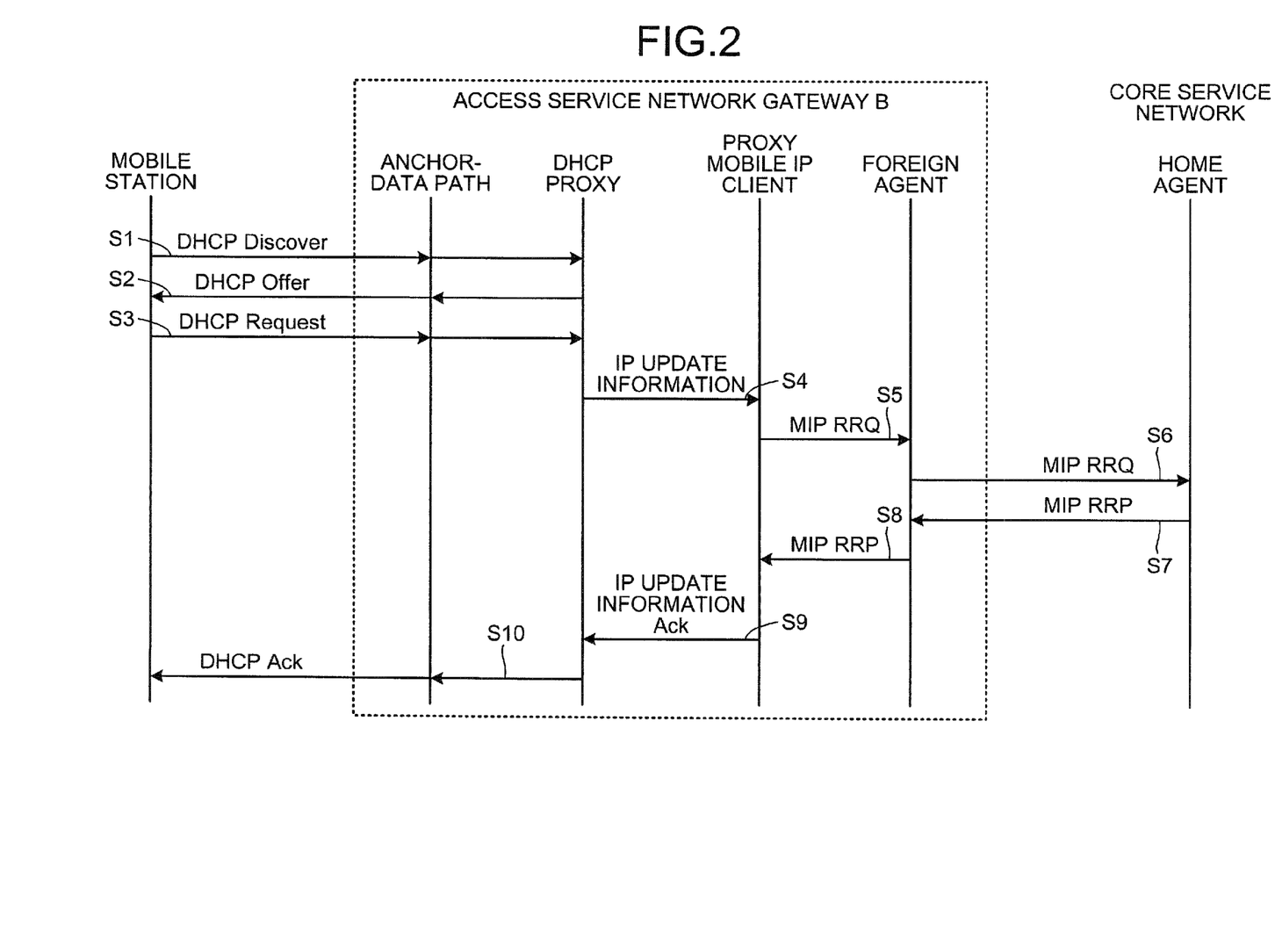
FIG. 2 is a schematic of an address update procedure through data paths after the relocation depicted in FIG. 1.

FIG. 2 is a schematic of an address update procedure through the data paths after the relocation depicted in FIG. 1. It is assumed that the mobile station 3 performs the initial network registration in advance when the mobile station 3 is connected to the base station 9 downstream from the access service network gateway A7 (see FIG. 9). In the state depicted in FIG. 9, an IP address is issued to the mobile station 3 from the DHCP proxy functioning unit A15 in the access service network gateway A7 to which the initial registration is performed. Subsequently, when the IP address is to be updated, the mobile station 3 requests the DHCP proxy functioning units 15 and 18 having the IP address of W to update the IP address.

Here, relocation occurs from the proxy mobile IP client functioning unit A13 and the foreign agent/anchor-data path functioning unit A14 to the proxy mobile IP client functioning unit B16 and the foreign agent/anchor-data path functioning unit B17 due to the handover of the mobile station 3. The access service network gateway B8 is notified of the DHCP proxy information in the access service network gateway A7 on this occasion and the relocation occurs from the DHCP proxy functioning unit A15 to the DHCP proxy functioning unit B18. In this case, the access service network gateway B8 recognizes that the access service network gateway B8 has become in control of the connection between the mobile station 3 and the home agent 4.

As depicted in FIG. 2, if the IP address is to be updated, the mobile station 3 first transmits a DHCP Discover message addressed to the IP address W. Since the DHCP proxy functioning unit B18 has the IP address of W, the access service network gateway B8 may receive the message addressed to the IP address W (arrows 31 and 32 of FIG. 1). In the access service network gateway B8, the DHCP Discover message is received by the DHCP proxy functioning unit B18 via the anchor-data path functioning unit of the foreign agent/anchor-data path functioning unit B17 (step S1, an arrow 33 of FIG. 1).

The DHCP proxy functioning unit B18 returns a DHCP Offer message to the mobile station 3 via the anchor-data path functioning unit of the foreign agent/anchor-data path functioning unit B17 (step S2, the arrows 33, 32, and 31 of FIG. 1). The mobile station 3 then transmits a DHCP Request message addressed to the IP address W (the arrows 31 and 32 of FIG. 1). The message is received by the DHCP proxy functioning unit B18 via the anchor-data path functioning unit of the foreign agent/anchor-data path functioning unit B17 (step S3, the arrow 33 of FIG. 1).

The DHCP proxy functioning unit B18 then executes the update process of the IP address of the mobile station 3 and sends IP update information to the proxy mobile IP client functioning unit B16 (step S4, an arrow 34 of FIG. 1). The proxy mobile IP client functioning unit B16 sends an MIP Registration Request (MIP RRQ) message to the home agent 4 via the foreign agent functioning unit of the foreign agent/anchor-data path functioning unit B17 (steps S5 and S6, arrows 35 and 36 of FIG. 1).

The home agent 4 performs registration again for a new IP address of the mobile station 3 and returns an MIP Registration Response (MIP RRP) message to the access service network gateway B8 (step S7, the arrow 36 of FIG. 1). The MIP Registration Response (MIP RRP) message is transferred to the proxy mobile IP client functioning unit B16 via the foreign agent functioning unit of the foreign agent/anchor-data path functioning unit B17 (step S8, the arrow 35 of FIG. 1).

The proxy mobile IP client functioning unit B16 sends an IP Update Information Acknowledgement (IP Update Information Ack) message to the DHCP proxy functioning unit B18 (step S9, the arrow 34 of FIG. 1). The DHCP proxy functioning unit B18 sends a DHCP Acknowledgement (DHCP Ack) message to the mobile station 3 via the anchor-data path functioning unit of the foreign agent/anchor-data path functioning unit B17 (step S10, the arrows 33, 32, and 31 of FIG. 1), thereby ending the address update for the mobile station 3.

Figure 3:
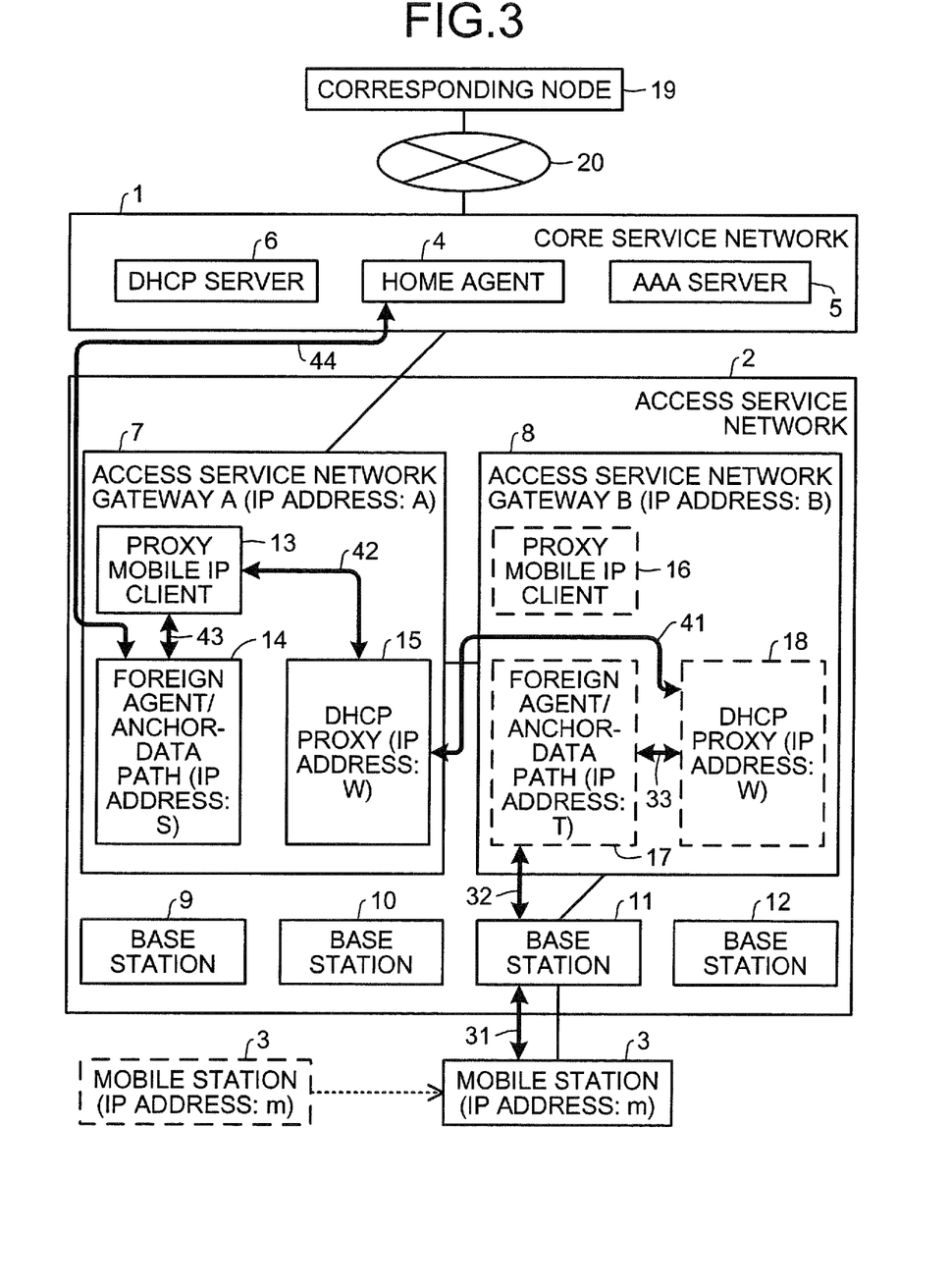
FIG. 3 is a schematic of a configuration and data paths of the mobile IP communication system before relocation according to the first embodiment.

FIG. 3 is a schematic of a configuration and data paths of the mobile IP communication system before relocation according to the first embodiment. As depicted in FIG. 3, although the connection destination of the mobile station 3 has changed to the base station 11 downstream from the access service network gateway B8 due to movement, no relocation occurs for the proxy mobile IP client functioning unit A13, the foreign agent/anchor-data path functioning unit A14, and the DHCP proxy functioning unit A15 in this example. Therefore, since the access service network gateway A7 does not report the DHCP proxy information to the access service network gateway B8, the access service network gateway B8 is not involved in the control of the connection between the mobile station 3 and the home agent 4.

If the IP address is to be updated in this situation, the DHCP proxy functioning unit B18 of the access service network gateway B8 first receives a DHCP Request message addressed to the IP address W from the mobile station 3 (arrows 31, 32, and 33 of FIG. 3). The access service network gateway B8 then determines that the IP address update process is not to be executed by the DHCP proxy functioning unit B18 in the access service network gateway B8 and transfers the DHCP Request message to the access service network gateway A7 (an arrow 41 of FIG. 3).

The DHCP proxy functioning unit A15 of the access service network gateway A7 receives the DHCP Request message, executes the update process for the IP address of the mobile station 3, and sends IP update information to the proxy mobile IP client functioning unit A13 (an arrow 42 of FIG. 3). The proxy mobile IP client functioning unit A13 sends a MIP Registration Request (MIP RRQ) message to the home agent 4 via the foreign agent functioning unit of the foreign agent/anchor-data path functioning unit A14 (arrows 43 and 44 of FIG. 3). The home agent 4 performs registration again for a new IP address of the mobile station 3 and returns Ack to the mobile station 3 through the path, thereby ending the address update for the mobile station 3.

Figure 4:
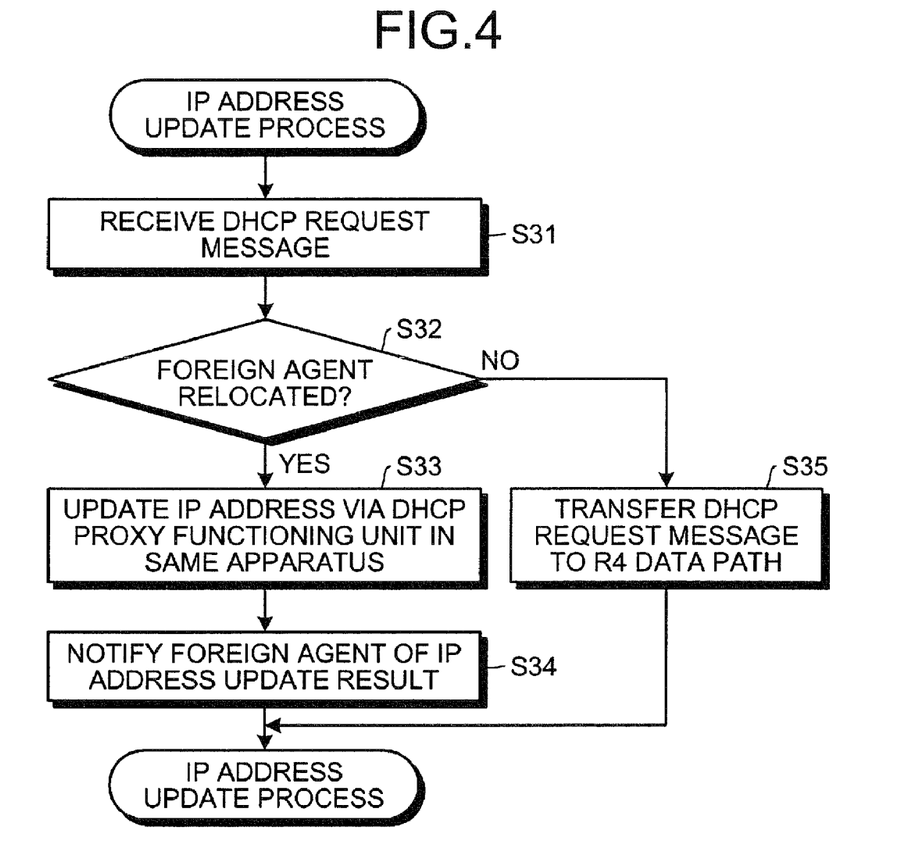
FIG. 4 is a flowchart of an address update process by the mobile IP communication system according to the first embodiment.

FIG. 4 is a flowchart of the address update process by the mobile IP communication system according to the first embodiment. The address update process of FIG. 4 is a process executed by the access service network gateway B8 in after the connection destination of the mobile station 3 has changed to the base station 11 downstream from the access service network gateway B8 due to movement, i.e., in the state of FIG. 1 or 3.

As depicted in FIG. 4, when the IP address update process is started, the DHCP proxy functioning unit B18 of the access service network gateway B8 receives the DHCP Request message from the mobile station 3 (step S31). The access service network gateway B8 determines whether the foreign agent functioning unit has been relocated from the access service network gateway A7 to the access service network gateway B8 (step S32). If relocated (step S32: YES), the access service network gateway B8 updates the IP address via the DHCP proxy functioning unit B18 (step S33).

The DHCP proxy functioning unit B18 notifies the foreign agent functioning unit in the access service network gateway B8 of the update result (step S34), thereby ending the IP address update process. On the other hand, if the foreign agent functioning unit is not relocated at step S32 (step S32: NO), the access service network gateway B8 transfers the DHCP Request message to the R4 data path (step S35), thereby ending the IP address update process in the access service network gateway B8. The actual IP address update process is executed in the access service network gateway A7, which is the transfer destination of the DHCP Request message and the foreign agent functioning unit in the access service network gateway A7 is notified of the update result.

Figure 5:
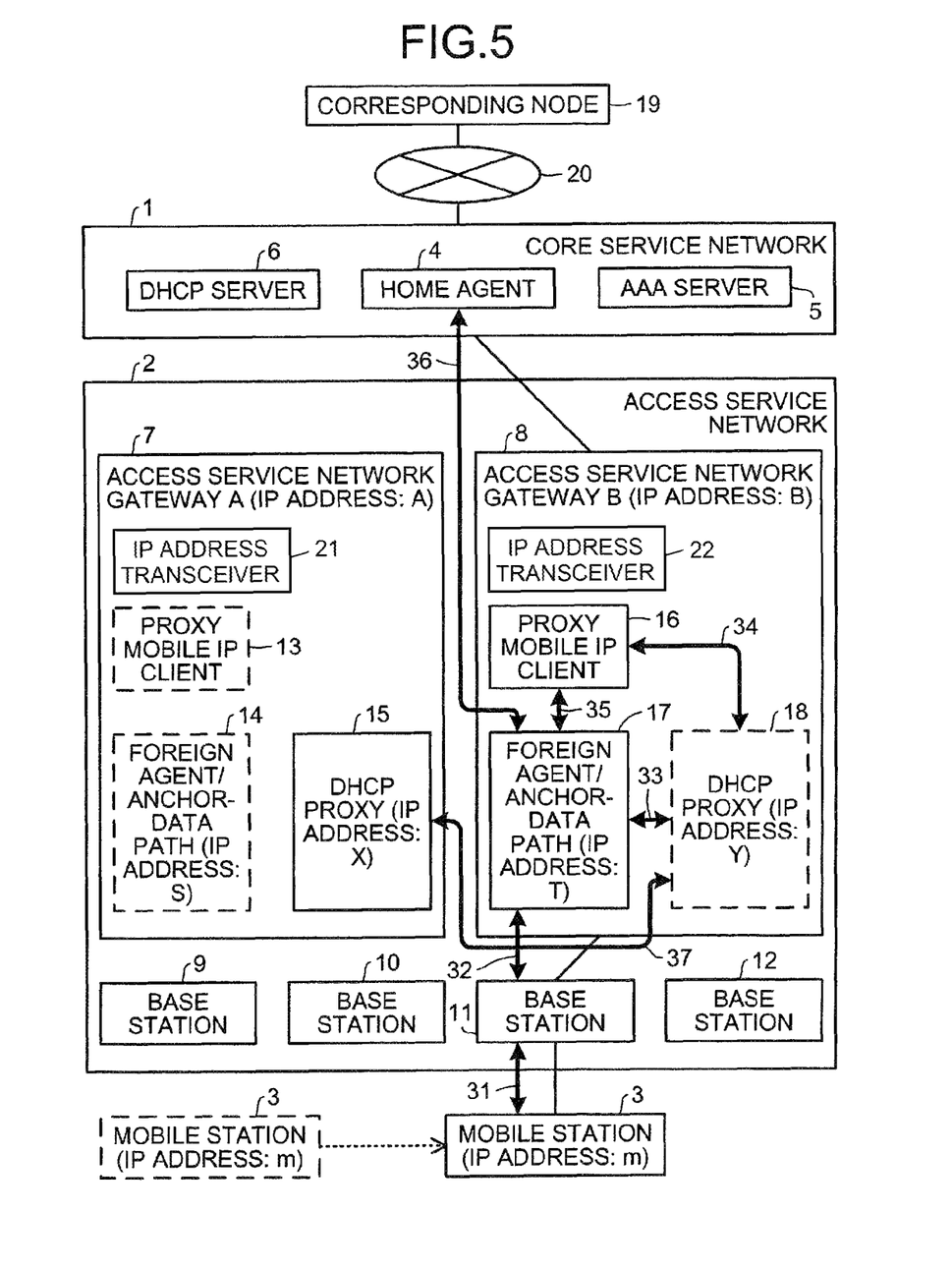
FIG. 5 is a schematic of a configuration and data paths of a mobile IP communication system after relocation according to a second embodiment of the present invention.

FIG. 5 is a schematic of a configuration and data paths of a mobile IP communication system after relocation according to a second embodiment of the present invention. As depicted in FIG. 5, the second embodiment is different from the first embodiment in that the DHCP proxy functioning units 15 and 18 have different IP addresses in the access service network gateway A7 and the access service network gateway B8. The IP address of the DHCP proxy functioning unit 15 is assumed to be X and the IP address of the DHCP proxy functioning unit 18 is assumed to be Y.

When the relocation occurs among the proxy mobile IP client functioning units 13 and 16 and the foreign agent/anchor-data path functioning units 14 and 17, the access service network gateways 7 and 8 have a function of reporting that the relocation has occurred. The access service network gateways 7 and 8 also have a function of reporting to the access service network gateway from which the relocation has occurred, the IP address of the access service network gateway to which the relocation occurs.

Figure 6:
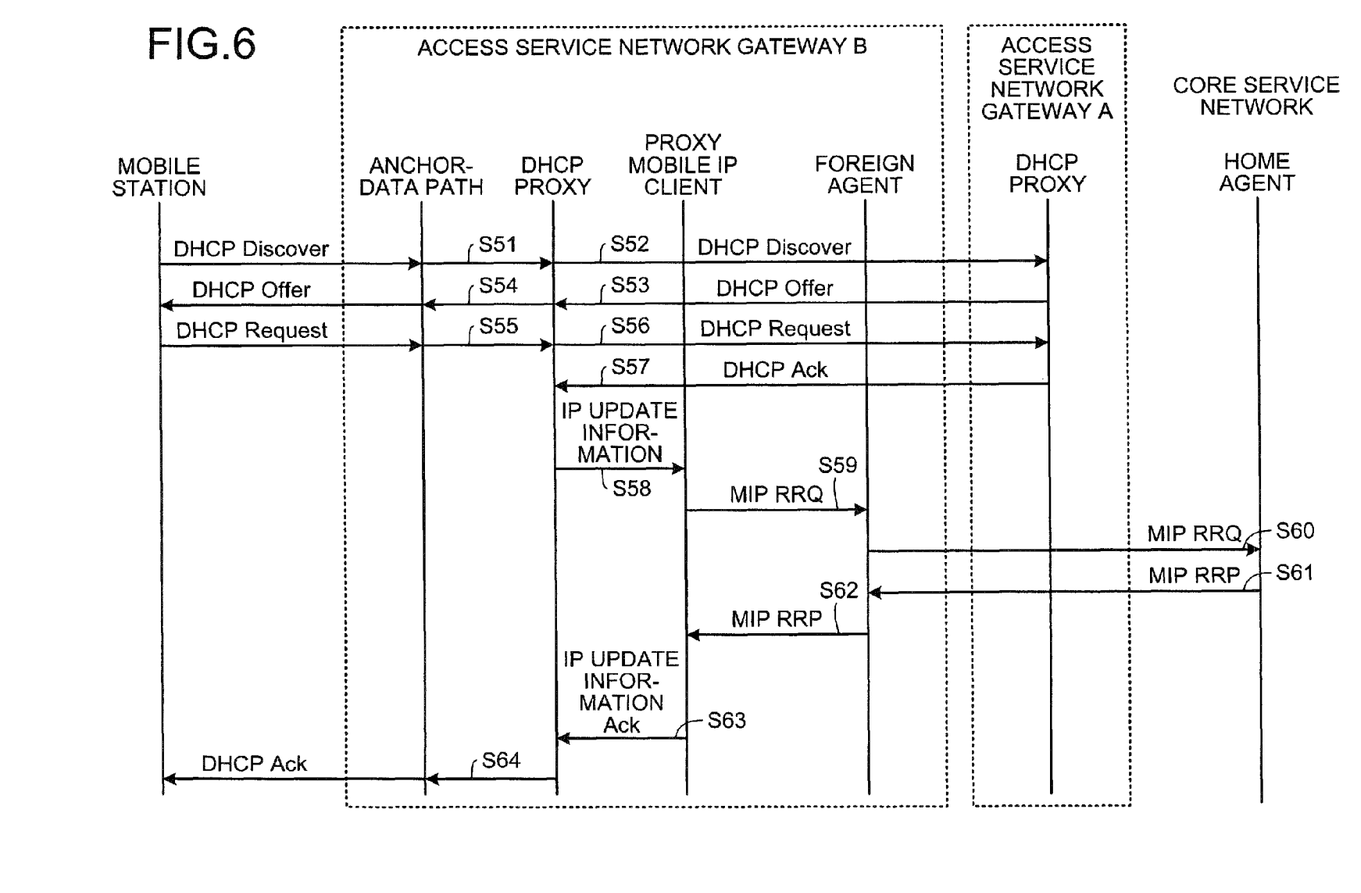
FIG. 6 is a schematic of an address update procedure through data paths after the relocation depicted in FIG. 5.

FIG. 6 is a schematic of an address update procedure through data paths after the relocation depicted in FIG. 5. It is assumed that the mobile station 3 performs the initial network registration to the access service network gateway A7 in advance similar to the first embodiment. Therefore, an IP address is issued to the mobile station 3 from the DHCP proxy functioning unit A15 in the access service network gateway A7 and the mobile station 3 requests the DHCP proxy functioning unit A15 having the IP address X to update the IP address.

Here, relocation occurs from the proxy mobile IP client functioning unit A13 and the foreign agent/anchor-data path functioning unit A14 to the proxy mobile IP client functioning unit B 16 and the foreign agent/anchor-data path functioning unit B 17 and the access service network gateway B8 is notified of this relocation by the access service network gateway A7. Further, the IP address transceiver 21 of the access service network gateway A7 is notified of the IP address B of the access service network gateway B8 by the IP address transceiver 22 of the access service network gateway B8. Since the access service network gateway A7 knows the IP address of the access service network gateway B8, the access service network gateway A7 may notify the access service network gateway B8 of the update result of the IP address.

As depicted in FIG. 6, if the IP address is to be updated, the mobile station 3 first transmits a DHCP Discover message addressed to the IP address X. Since the mobile station 3 is located downstream from the access service network gateway B8, the access service network gateway B8 receives the message addressed to the IP address X (arrows 31 and 32 of FIG. 5). In the access service network gateway B8, the DHCP Discover message is received by the DHCP proxy functioning unit B18 via the anchor-data path functioning unit of the foreign agent/anchor-data path functioning unit B17 (step S51, an arrow 33 of FIG. 5).

The DHCP proxy functioning unit B18 transfers the DHCP Discover message addressed to the IP address X to the DHCP proxy functioning unit A15 (IP address: X) of the access service network gateway A7 (step S52, an arrow 37 of FIG. 5). The DHCP proxy functioning unit A15 returns a DHCP Offer message to the DHCP proxy functioning unit B18 (step S53, the arrow 37 of FIG. 5). The DHCP proxy functioning unit B18 transfers the DHCP Offer message to the mobile station 3 via the anchor-data path functioning unit of the foreign agent/anchor-data path functioning unit B17 (step S54, the arrows 33, 32, and 31 of FIG. 5).

The mobile station 3 then transmits a DHCP Request message addressed to the IP address X (the arrows 31 and 32 of FIG. 5). The message is received by the DHCP proxy functioning unit B18 via the anchor-data path functioning unit of the foreign agent/anchor-data path functioning unit B17 of the access service network gateway B8 (step S55, the arrow 33 of FIG. 5).

The DHCP proxy functioning unit B18 transfers the DHCP Request message addressed to the IP address X to the DHCP proxy functioning unit A15 (IP address: X) (step S56, the arrow 37 of FIG. 5). The DHCP proxy functioning unit A15 executes the update process of the IP address of the mobile station 3 and returns a DHCP Ack message to the DHCP proxy functioning unit B18. The DHCP proxy functioning unit B18 sends the IP update information to the proxy mobile IP client functioning unit B16 (step S58, an arrow 34 of FIG. 5). The proxy mobile IP client functioning unit B16 sends an MIP Registration Request (MIP RRQ) message to the home agent 4 via the foreign agent functioning unit of the foreign agent/anchor-data path functioning unit B17 (steps S59 and S60, arrows 35 and 36 of FIG. 5).

The home agent 4 performs registration again for a new IP address of the mobile station 3 and returns an MIP Registration Response (MIP RRP) message to the access service network gateway B8 (step S61, the arrow 36 of FIG. 5). The MIP Registration Response (MIP RRP) message is transferred to the proxy mobile IP client functioning unit B16 via the foreign agent functioning unit of the foreign agent/anchor-data path functioning unit B17 (step S62, the arrow 35 of FIG. 5).

The proxy mobile IP client functioning unit B16 sends an IP Update Information Ack message to the DHCP proxy functioning unit B18 (step S63, the arrow 34 of FIG. 5). The DHCP proxy functioning unit B18 sends a DHCP Ack message to the mobile station 3 via the anchor-data path functioning unit of the foreign agent/anchor-data path functioning unit B17 (step S64, the arrows 33, 32, and 31 of FIG. 5) to terminate the address update of the mobile station 3.

Figure 7:
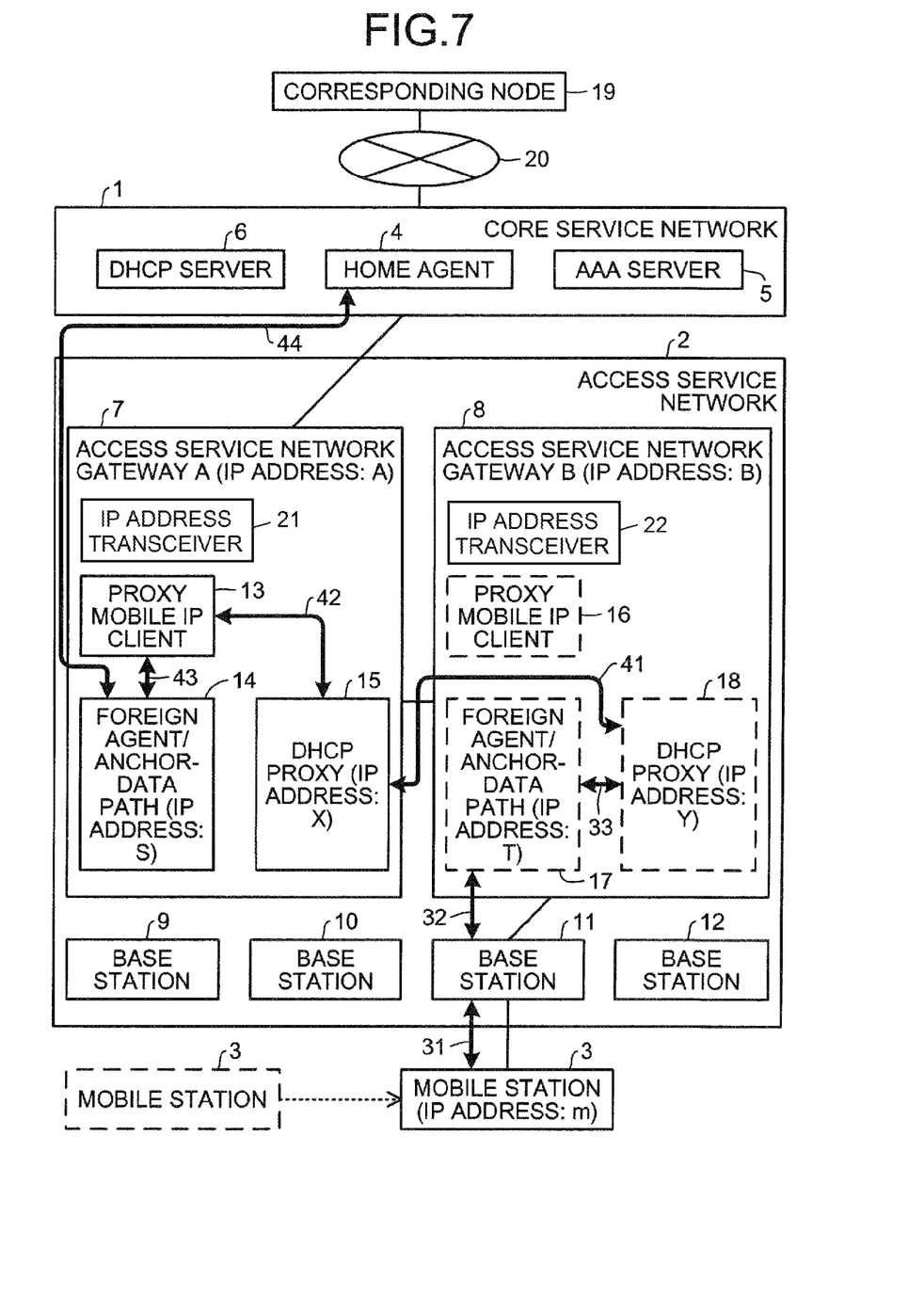
FIG. 7 is a schematic of a configuration and data paths of the mobile IP communication system before relocation according to the second embodiment.

FIG. 7 is a schematic of a configuration and data paths of the mobile IP communication system before relocation according to the second embodiment. As depicted in FIG. 7, although the connection destination of the mobile station 3 has changed to the base station 11 downstream from the access service network gateway B8 due to movement, no relocation occurs for the proxy mobile IP client functioning unit A13 and the foreign agent/anchor-data path functioning unit A14 in this example. Therefore, since the access service network gateway A7 does not notify the access service network gateway B8 of the information indicative of the occurrence of the relocation, the access service network gateway B8 is not involved in the control of the connection between the mobile station 3 and the home agent 4.

If the IP address is to be updated in this situation, the DHCP proxy functioning unit B18 of the access service network gateway B8 first receives a DHCP Request message addressed to the IP address X from the mobile station 3 (arrows 31, 32, and 33 of FIG. 7). The access service network gateway B8 then determines that the IP address update process is not necessary to be executed by the DHCP proxy functioning unit B18 in the access service network gateway B8 and transfers the DHCP Request message to the access service network gateway A7 (an arrow 41 of FIG. 7).

The DHCP proxy functioning unit A15 of the access service network gateway A7 receives the DHCP Request message, executes the update process of the IP address of the mobile station 3, and sends the IP update information to the proxy mobile IP client functioning unit A13 (an arrow 42 of FIG. 7). The proxy mobile IP client functioning unit A13 sends an MIP Registration Request (MIP RRQ) message to the home agent 4 via the foreign agent functioning unit of the foreign agent/anchor-data path functioning unit A14 (arrows 43 and 44 of FIG. 7). The home agent 4 performs registration again for a new IP address of the mobile station 3 and returns Ack to the mobile station 3 through the path, thereby ending the address update for the mobile station 3.

Figure 8:
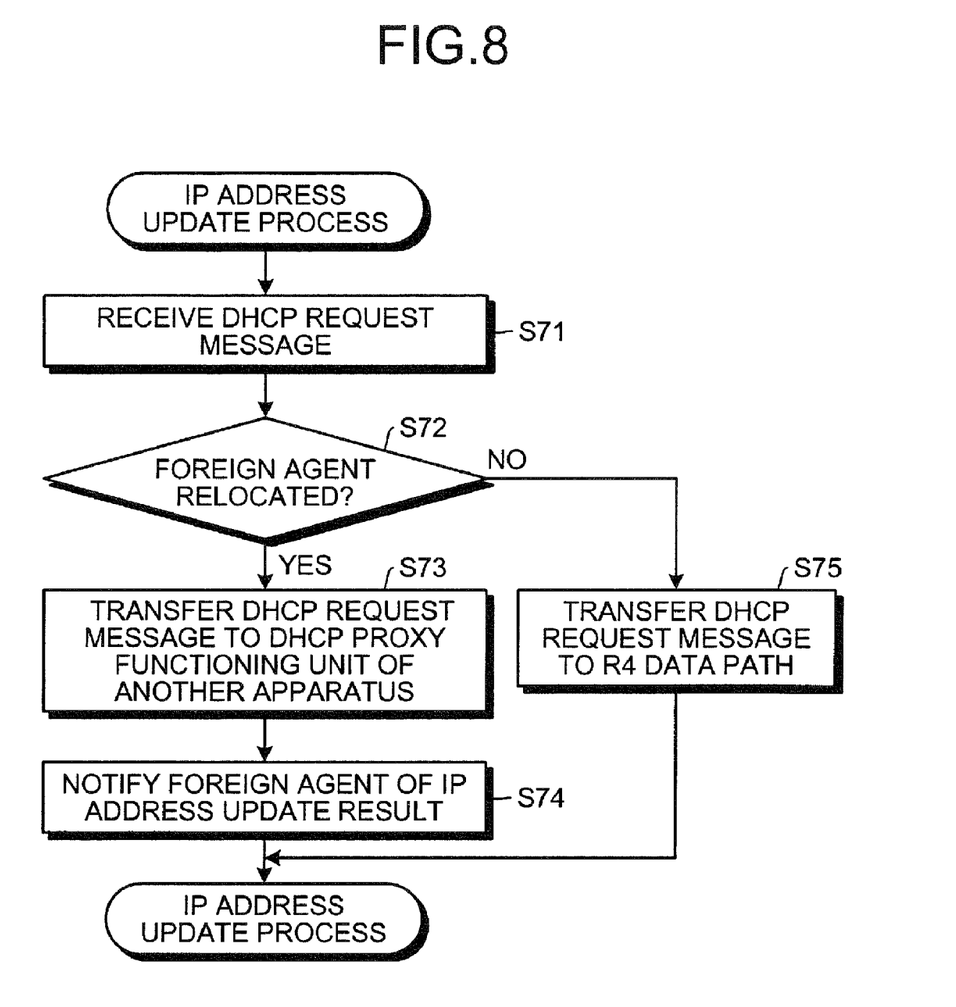
FIG. 8 is a flowchart of an address update process in the mobile IP communication system according to the second embodiment.

FIG. 8 is a flowchart of the address update process in the mobile IP communication system according to the second embodiment. The address update process depicted in FIG. 8 is executed by the access service network gateway B8 after the connection destination of the mobile station 3 has changed to the base station 11 downstream from the access service network gateway B8 due to movement, i.e., in the state of FIG. 5 or 7.

As depicted in FIG. 8, when the IP address update process is started, the DHCP proxy functioning unit B18 of the access service network gateway B8 receives the DHCP Request message from the mobile station 3 (step S71). The access service network gateway B8 determines whether the foreign agent functioning unit has been relocated from the access service network gateway A7 to the access service network gateway B8 (step S72).

If relocated (step S72: YES), the access service network gateway B8 transfers the DHCP Request message to the DHCP proxy functioning unit A15 of the access service network gateway A7 (step S73). The access service network gateway A7 of the transfer destination of the DHCP Request message executes the IP address update process. The DHCP proxy functioning unit B18 subsequently receives the IP address update result from the access service network gateway A7 and notifies the foreign agent functioning unit in the access service network gateway B8 of the IP address update result (step S74), thereby ending the IP address update process.

On the other hand, if the foreign agent functioning unit is not relocated at step S72 (step S72: NO), the access service network gateway B8 transfers the DHCP Request message to the R4 data path (step S75), thereby ending the IP address update process in the access service network gateway B8. In this case, the access service network gateway A7 of the transfer destination of the DHCP Request message executes the IP address update process and the foreign agent functioning unit in the access service network gateway A7 is notified of the update result.

According to the first embodiment, since the DHCP proxy functioning units 15 and 18 share a common IP address W, all the DHCP proxy functioning units 15 and 18 may receive the DHCP Request messages from all the mobile stations. Therefore, in the access service network gateways 7 and 8 updating the IP address of the mobile station 3, since the DHCP proxy functioning units 15 and 18 may communicate the IP address update status to the foreign agent/anchor-data path functioning units 14 and 17 in the access service network gateways 7 and 8, the mobile IP operation may be implemented following changes of the HoA (Home Address) due to the IP address update.

According to the first embodiment, since the DHCP proxy functioning unit A15 of the access service network gateway A7 from which the relocation occurs, reports the release time, etc. for the IP address of the mobile station 3 to the DHCP proxy functioning unit B18 of the access service network gateway B8 to which the relocation occurs, the DHCP proxy functioning unit B18 is able to take over the IP address update process. Therefore, the foreign agent/anchor-data path functioning unit B17 and the DHCP proxy functioning unit B18 in the access service network gateway B8 may control the connection between the certain mobile station 3 and the home agent 4.

According to the second embodiment, since the access service network gateway B8 after the relocation makes a notification of the IP address, the access service network gateway A7 before the relocation may know the transfer destination (the access service network gateway B8) of the result of the IP address update by the DHCP proxy functioning unit A15. Therefore, if the DHCP proxy functioning unit A15 and the foreign agent/anchor-data path functioning unit B17 are not located in the same access service network gateway, the foreign agent/anchor-data path functioning unit B17 after the relocation may know the IP address update status.

Hence, according to the first or second embodiment, since the update process may be continued for the IP address issued by dynamic IP address allocating function (DHCP) even if a mobile station without a mobile IP client function moves, connection with network may be maintained. The present invention is not limited to WiMAX provided the communication scheme relates to a mobile IP using DHCP.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile IP communication system comprising:
a plurality of mobile IP communication apparatuses in an access service network and comprising proxy mobile IP client functioning units, foreign agent functioning units, and DHCP proxy functioning units, the DHCP proxy functioning units having a common IP address, wherein
the DHCP proxy functioning unit of a first mobile IP communication apparatus connected with a mobile station before movement includes a unit that reports information about the mobile station to a second mobile IP communication apparatus connected with the mobile station after movement,
the DHCP proxy functioning unit of the second mobile IP communication apparatus includes a unit that acquires from the first mobile IP communication apparatus, information about the mobile station and a unit that receives an update message addressed to the common IP address and sent from the mobile station, executes an IP address update process based on the information about the mobile station, and reports an update result to the proxy mobile IP client functioning unit and the foreign agent functioning unit in the second mobile IP communication apparatus, wherein
the DHCP proxy functioning unit of the second mobile IP communication apparatus includes a unit that receives an update message addressed to the common IP address sent from a mobile station without information notification and transfers the update message to the first mobile IP communication apparatus, and
the DHCP proxy functioning unit of the first mobile IP communication apparatus includes a unit that receives the update message sent from the second mobile IP communication apparatus, executes an IP address update process, and reports the update result to the proxy mobile IP client functioning unit and the foreign agent functioning unit in the first mobile IP communication apparatus.

2. The mobile IP communication system according to claim 1, wherein the mobile IP communication apparatus is an access service network gateway.

3. A mobile IP communication system comprising:
a plurality of mobile IP communication apparatuses in an access service network and comprising proxy mobile IP client functioning units, foreign agent functioning units, and DHCP proxy functioning units, wherein
a first mobile IP communication apparatus connected with a mobile station before movement includes a unit that acquires an IP address of to a second mobile IP communication apparatus connected with the mobile station after movement, the DHCP proxy functioning unit of the first mobile IP communication apparatus includes a unit that reports information about the mobile station to the second mobile IP communication apparatus, and a unit that receives an update message from the second mobile IP communication apparatus, executes an IP address update process, and transfers an update result to the second mobile IP communication apparatus,
the second mobile IP communication apparatus includes a unit that reports the IP address of the second mobile IP communication apparatus to the first mobile IP communication apparatus,
the DHCP proxy functioning unit of the second mobile IP communication apparatus includes a unit that acquires from the first mobile IP communication apparatus, information about the mobile station, a unit that receives an update message sent from the mobile station and addressed to the IP address of the first mobile IP communication apparatus, a unit that transfers the update message to the first mobile IP communication apparatus, and a unit that acquires update contents sent from the first mobile IP communication apparatus in response to the transfer of the update message and that reports the update contents to the proxy mobile IP client functioning unit and the foreign agent functioning unit in the second mobile IP communication apparatus, wherein
the DHCP proxy functioning unit of the second mobile IP communication apparatus includes a unit that receives an update message addressed to the IP address of the first mobile IP communication apparatus and sent from a mobile station without information notification, and that transfers the update message to the first mobile IP communication apparatus, and
the DHCP proxy functioning unit of the first mobile IP communication apparatus includes a unit that receives the update message sent from the second mobile IP communication apparatus, executes an IP address update process, and reports the update result to the proxy mobile IP client functioning unit and the foreign agent functioning unit in the first mobile IP communication apparatus.

4. The mobile IP communication system according to claim 3, wherein the mobile IP communication apparatus is an access service network gateway.

5. A mobile IP communication method executed by a mobile IP communication apparatus comprising a proxy mobile IP client functioning unit, a foreign agent functioning unit, and a DHCP proxy functioning unit, the mobile IP communication method comprising:
reporting, by the DHCP proxy functioning unit of a first mobile IP communication apparatus connected with a mobile station before movement, information about the mobile station to a second mobile IP communication apparatus connected with the mobile station after movement;
acquiring from the first mobile IP communication apparatus and by the DHCP proxy functioning unit of the second mobile IP communication apparatus, the information about the mobile station;
receiving, by the DHCP proxy functioning unit of the second mobile IP communication apparatus, an update message addressed to a common IP address sent from the mobile station, the common IP address being for the DHCP proxy functioning units respectively included in the first and the second mobile IP communication apparatuses that are in an access service network and respectively include the proxy mobile IP client functioning unit and the foreign agent functioning unit;
executing, by the DHCP proxy functioning unit of the second mobile IP communication apparatus, an IP address update process based on the information about the mobile station;

reporting, by the DHCP proxy functioning unit of the second mobile IP communication apparatus, an IP address update result to the proxy mobile IP client functioning unit and the foreign agent functioning unit in the second mobile IP communication apparatus;

receiving, by the DHCP proxy functioning unit of the second mobile IP communication apparatus, an update message addressed to the common IP address and sent from a mobile station without information notification;

transferring, by the DHCP proxy functioning unit of the second mobile IP communication apparatus, the update message to the first mobile IP communication apparatus;

receiving, by the DHCP proxy functioning unit of the first mobile IP communication apparatus, the update message transferred by the DHCP proxy functioning unit of the second mobile IP communication apparatus;

executing, by the DHCP proxy functioning unit of the first mobile IP communication apparatus, an IP address update process; and reporting, by the DHCP proxy functioning unit of the first mobile IP communication apparatus, the IP address update result to the proxy mobile IP client functioning unit and the foreign agent functioning unit in the first mobile IP communication apparatus.

6. The mobile IP communication method according to claim 5, wherein the DHCP proxy functioning unit has a common IP address in an access service network to which the mobile IP communication apparatus belongs and includes a unit that receives an update message addressed to the common IP address sent from a mobile station, executes an IP address update process, and reports an update result to the proxy mobile IP client functioning unit and the foreign agent functioning unit.

7. The mobile IP communication method according to claim 6, wherein the DHCP proxy functioning unit includes a unit that when allowing a second mobile IP communication apparatus to take over communication with the mobile station, reports information about the mobile station to the second mobile IP communication apparatus.

8. The mobile IP communication method according to claim 6, wherein the DHCP proxy functioning unit includes a unit that when taking over communication with a mobile station from a second mobile IP communication apparatus, acquires from the second mobile IP communication apparatus, information about the mobile station.

9. The mobile IP communication method according to claim 6, wherein the DHCP proxy functioning unit includes a unit that receives an update message addressed to the common IP address sent from a mobile station without information notification from a second mobile IP communication apparatus and transfers the update message to the second mobile IP communication apparatus.

10. A mobile IP communication method executed by a mobile IP communication apparatus comprising a proxy mobile IP client functioning unit, a foreign agent functioning unit, and a DHCP proxy functioning unit, the mobile IP communication method comprising:

reporting, by a first mobile IP communication apparatus connected with a mobile station before movement, information about the mobile station to a second mobile IP communication apparatus connected with the mobile station after movement, the first and the second mobile IP communication apparatuses being in an access service network and respectively comprising the proxy mobile IP client functioning unit, the foreign agent functioning unit, and the DHCP proxy functioning unit;

reporting, by the second mobile IP communication apparatus, an IP address of the second mobile IP communication apparatus to the first mobile IP communication apparatus;

acquiring, from the first mobile IP communication apparatus and by the DHCP proxy functioning unit of the second mobile IP communication apparatus, the information about the mobile station;

acquiring, by the first mobile IP communication apparatus, the IP address of the second mobile IP communication apparatus;

receiving, from the mobile station and by the DHCP proxy functioning unit of the second mobile IP communication apparatus, an update message addressed to an IP address of the first mobile IP communication apparatus;

transferring, by the DHCP proxy functioning unit of the second mobile IP communication apparatus, the update message to the first mobile IP communication apparatus;

receiving, by the DHCP proxy functioning unit of the first mobile IP communication apparatus, the update message transferred from the second mobile IP communication apparatus;

executing, by the DHCP proxy functioning unit of the first mobile IP communication apparatus, an IP address update process and transferring an update result to the second mobile IP communication apparatus; and acquiring, by the DHCP proxy functioning unit of the second mobile IP communication apparatus, update contents sent from the first mobile IP communication apparatus in response to the transfer of the update message;

reporting, by the DHCP proxy functioning unit of the second mobile IP communication apparatus, the update contents to the proxy mobile IP client functioning unit and the foreign agent functioning unit in the second mobile IP communication apparatus;

receiving, by the DHCP proxy functioning unit of the second mobile IP communication apparatus, an update message addressed to the IP address of the first mobile IP communication apparatus and sent from a mobile station without information notification;

transferring, by the DHCP proxy functioning unit of the second mobile IP communication apparatus, the update message to the first mobile IP communication apparatus;

receiving, by the DHCP proxy functioning unit of the first mobile IP communication apparatus, the update message transferred by the DHCP proxy functioning unit of the second mobile IP communication apparatus;

executing, by the DHCP proxy functioning unit of the first mobile IP communication apparatus, an IP address update process; and reporting, by the DHCP proxy functioning unit of the first mobile IP communication apparatus, an IP address update result to the proxy mobile IP client functioning unit and the foreign agent functioning unit in the first mobile IP communication apparatus.

11. The mobile IP communication method according to claim 10, wherein the DHCP proxy functioning unit includes:

a unit that acquires from a second mobile IP communication apparatus, information that is about a mobile station, receives an update message sent from the mobile station, transfers the update message to the second mobile IP communication apparatus, and a unit that acquires update contents sent from the second mobile IP communication apparatus in response to the transfer of the update message and reports the update contents to the proxy mobile IP client functioning unit and the foreign agent functioning unit.

12. The mobile IP communication method according to claim 11, wherein the DHCP proxy functioning unit includes a unit that receives from a mobile station without information notification, an update message addressed to an IP address of the second mobile IP communication apparatus, and transfers the update message to the second mobile IP communication apparatus.

* * * * *